United States Patent [19]

Liston et al.

[11] 3,962,085

[45] June 8, 1976

[54] SKIMMER ASSEMBLY

[75] Inventors: Max Davis Liston, Irvine; Gerald Paul Frison, Dana Point, both of Calif.

[73] Assignee: Abbott Laboratories, North Chicago, Ill.

[22] Filed: Dec. 23, 1974

[21] Appl. No.: 535,225

Related U.S. Application Data

[63] Continuation-in-part of Ser. No. 426,433, Dec. 19, 1973, abandoned.

[52] U.S. Cl. .............................. 210/131; 23/258.5 R; 23/259; 128/2 F; 128/DIG. 5; 210/359; 210/DIG. 23
[51] Int. Cl.² .......................................... B01D 33/00
[58] Field of Search ............... 23/230 B, 258.5, 259, 23/292; 128/2 F, 218 M, 218 NV, 220, DIG. 5; 210/131, 359, 429, DIG. 23, DIG. 24

[56] References Cited
UNITED STATES PATENTS

| | | | |
|---|---|---|---|
| 3,013,557 | 12/1961 | Pallotta | 128/DIG. 5 |
| 3,659,749 | 5/1972 | Schwartz | 128/218 M |
| 3,661,265 | 5/1972 | Greenspan | 210/DIG. 23 |
| 3,699,961 | 10/1972 | Szpur | 128/218 M |
| 3,832,141 | 8/1974 | Haldopoulos | 210/359 X |
| 3,846,077 | 11/1974 | Ohringer | 210/359 X |
| 3,865,731 | 2/1971 | Seitz | 210/359 |
| 3,870,639 | 3/1975 | Moore et al. | 23/259 X |
| 3,873,449 | 3/1975 | Connelly et al. | 210/359 |

FOREIGN PATENTS OR APPLICATIONS

| | | | |
|---|---|---|---|
| 791,700 | 3/1958 | United Kingdom | 128/218 NV |
| 209,491 | 1/1924 | United Kingdom | 210/429 |

*Primary Examiner*—Charles N. Hart
*Assistant Examiner*—Robert G. Mukai
*Attorney, Agent, or Firm*—Raymond L. Madsen

[57] ABSTRACT

There is disclosed a plunger and filter assembly for insertion into the end of a collector cylinder whereby the cylinder with the assembly may be inserted into a vial to skim off the fluid contents therein. A plunger member has a cylindrical shape and a central opening therethrough, one end of the plunger having a smaller diameter than the other end thereof for insertion into one end of a collector cylinder. The other end of the plunger member has a diameter larger than the collector cylinder to engage and seal the plunger member with the interior wall of a vial into which the collector cylinder with the plunger member installed therein may be inserted. A circular disc valve having a diameter substantially the same as the one end of the plunger member is movably mounted on the one end such that when inserted into the vial, the uppermost contents of the vial are passed through the central opening of the plunger and between the one end of the plunger and the disc valve into the cylinder and when the cylinder with the plunger and valve assembly are removed from the vial, the disc valve closes the one end of the plunger to retain the contents passed therethrough thereby skimming the uppermost contents of the vial passed therethrough. The other end of the plunger is adapted to receive a filter disc whereby the skimmed contents of the vial are filtered.

In another embodiment the disc valve is omitted and the collector cylinder has openings in the side thereof and a receptacle above the openings whereby the contents of the vial are passed through the disc filter and the central opening of the plunger, through the side openings in the collector cylinder and between the walls of the vial and the collector cylinder into the receptacle.

10 Claims, 10 Drawing Figures

SKIMMER ASSEMBLY

This is a continuation-in-part of application Ser. No. 426,433 filed Dec. 19, 1973 and now abandoned.

The present invention relates to apparatus for skimming fluids and more particularly to serum sampling devices for obtaining filtered serum samples from sedimented or centrifuged blood for clot-free aspiration and for direct analysis.

In the field of blood analysis, it has been the practice to employ a centrifuge to "spin" blood samples to separate the blood serum from the other constituents of the blood. After spinning down the blood sample, the serum appears as a clear liquid above the more dense and opaque constituents of the blood sample. A line or division commonly known as a "crit" is formed between the serum portion and the remaining constituents of the blood. It has been the practice to utilize tubes for insertion into the serum portion of the sample to aspirate or remove by suction samples of the serum for analysis. Other methods employ decanting the blood sample by pouring off the serum portions into another vial for analysis. Although these techniques have been successful in most instances, they do not filter out some of the undesirable products such as fibrin which is a white insoluable fibrous protein formed in the coagulation of blood.

To overcome this problem, it has been the practice in another method to employ filters in the tube sample systems or the decanting methods through which the serum is passed to exclude the unwanted particles including the fibrous protein. One method employed utilizes a cylinder with a filter mounted in the end thereof which is inserted into the sample vial down to the point of the "crit" in the sample vial, the serum portion passing through the filter into the cylinder. The entire combination of the cylinder and sample vial are then tilted to pour out the filtered serum into another container for analysis. Rather than tilting and pouring, an improvement of this method employs a stopper mounted in the end of a second cylinder, the stopper having an elongated tube passing therethrough such that when the stopper and cylinder are inserted into the filter cylinder, the fluid contents are forced through the elongated tube and into the second cylinder. The elongated tube may be extended from the second cylinder to collect the fluid in another external container.

Although such devices have served the purpose, they have not proved entirely satisfactory under all conditions of service for the reason that the filter cylinder alone could not remove the contents of the sample vial and required further decanting or the insertion of a second cylinder device as described above to remove the contents of the filter cylinder. The complexity of such a sampling method is time consuming and costly. This is overcome by the present invention.

Those concerned with the development of serum sampling devices have long recognized the need for a simple serum skimmer which could filter the serum and remove the skimmed serum from the sample vial in one operation and provide a skimmed sample ready for direct analysis or analysis in the skimmer device directly itself. The present invention fulfills this need.

Another problem confronting the developers of serum skimmers is the difficulty of manually handling the skimming devices. The small size and cylindrical shape of the collecting containers make it difficult for the human operator to grasp and securely hold the containers. This problem is overcome by the present invention.

The general purpose of this invention is to provide a serum skimming device which embraces all the advantages of similarly employed serum skimmers and possesses none of the aforedescribed disadvantages. To attain this, the present invention contemplates a unique plunger, filter and collector cylinder combination whereby the multiplicity of steps for skimming blood serum heretofore required are avoided. Further, the present invention contemplates direct analysis of the filtered contents collected in the cylinder without removal of the contents for further analysis.

An object of the present invention is the provision of a blood serum skimmer which collects and retains the serum sample therein.

Another object is to provide a blood serum skimming device which filters and collects the skimmed serum and retains the same therein.

A further object of the invention is the provision of a serum skimmer which can be inserted into a sample vial, collect and filter the skimmed contents thereof and retain the collected contents within the serum skimmer for positioning anywhere within or without the sample vial.

Still another object is to provide a serum skimmer which can easily be grasped and held securely between the thumb and index finger of a human operator.

Yet another object of the present invention is the provision of detaching the holding portion of the skimmer after the human operator has performed the skimming operation.

A still further object of the present invention is the provision of a serum skimmer of simplified construction and low cost materials such that it may be thrown away after it has been used.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
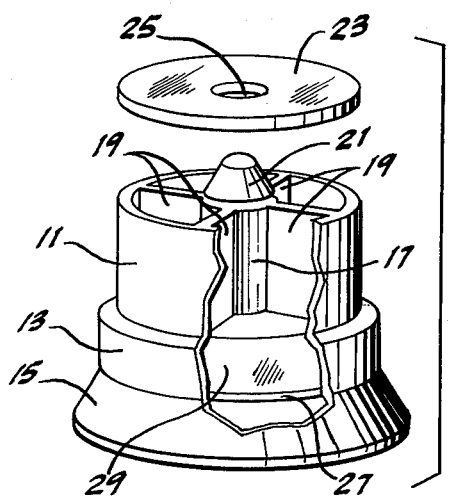
FIG. 1 shows a cut-away partly exploded perspective view, of the plunger, filter and valve assembly of one embodiment of the invention.

Referring now to the drawings wherein like reference characters designate like or corresponding parts throughout the several views, there is shown in FIG. 1 (which illustrates the plunger, filter and valve assembly) a cylinder section 11 which in turn is integrally connected to another cylinder section 13 of larger diameter forming a shoulder at their juncture. Cylinder section 13 is further integrally joined to a conical skirt or lip 15 which extends outwardly from cylinder section 13. Interior to cylinder section 11 is shaft 17 centrally located within the central opening of cylinder section 11 by four flat radial ribs 19. Ribs 19 extend along perpendicular diameters of cylinder section 11 and are integrally formed to shaft 17 and to the interior walls of cylinder section 11. Ribs 19 further extend along the length of cylinder section 11 and are rectangular in shape. Shaft 17 extends outwardly from the end of cylinder section 11 opposite the end joined to cylinder section 13. The extension of shaft 17 abruptly increases in diameter to form shoulder 21 thereon. Continuing further outwardly, shoulder 21 decreases in diameter and terminates at the end of shaft 17. There is a gap between shoulder 21 and the end of cylinder section 11. Valve disc 23 has opening 25 centrally located therein to form an annular disc, opening 25 being forced over shoulder 21 whereby disc 23 is slideably engaged on shaft 17 between shoulder 21 and the end of cylinder section 11.

Filter 29 is shaped to fit into the interior volume of cylinder section 13. It is fixedly held therein by circular lip 27 extending around the circumference of the interior edge of cylinder section 13 adjacent conical section 15. Filter 29 rests against the end of shaft 17 and ribs 19 at the other end of cylinder section 13. Filter 29 may be a fiberglass filter element.

Figure 2:
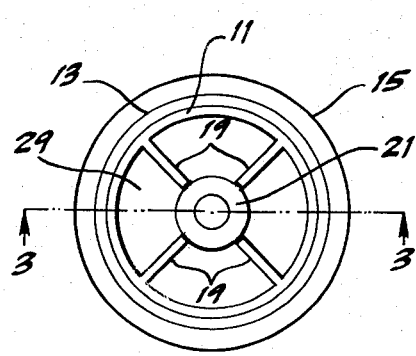
FIG. 2 illustrates a top view of the assembly shown in FIG. 1 with the disc valve removed.

FIG. 2 illustrates a top view of the assembly shown in FIG. 1 with valve disc 23 removed. Ribs 19 are shown located along perpendicular diameters of cylinder section 11. The shoulder formed by the difference in diameters between cylinder sections 11 and 13 at their juncture is visible as well as conical section 15 extending outwardly from cylinder section 13. The central shaft 17 is obscured by shoulder 21.

Figure 3:
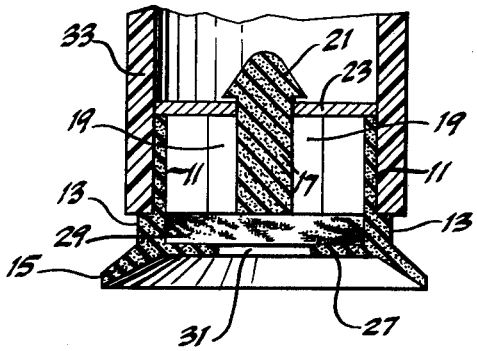
FIG. 3 shows a cross section of the assembly inserted in the collector cylinder taken on line 3—3 of FIG. 2 looking in the direction of the arrows.

FIG. 3 illustrates a cross section view of the plunger, filter and valve assembly including a portion of the cylinder end into which the assembly is mounted. The plunger and valve are shown made of a flexible material such as rubber or soft plastic. Cylinder section 11 is shown interior to cylinder 33, the edge of cylinder 33 resting against the shoulder formed by the juncture of cylinder section 11 and cylinder section 13. Conical section 15 has tapered flexible walls so as to adapt readily to the interior of a sample vial into which the assembly and cylinder are inserted. Flexible circular lip 27 extends radially inward within cylinder section 13 at its juncture with conical section 15. Filter 29 is forceably inserted through flexible opening 31 and held between ribs 19 and shaft 17 on one side and lip 27 on the other. Flexible valve disc 23 is mounted between shoulder 21 and the end of cylinder section 11.

Figure 4:
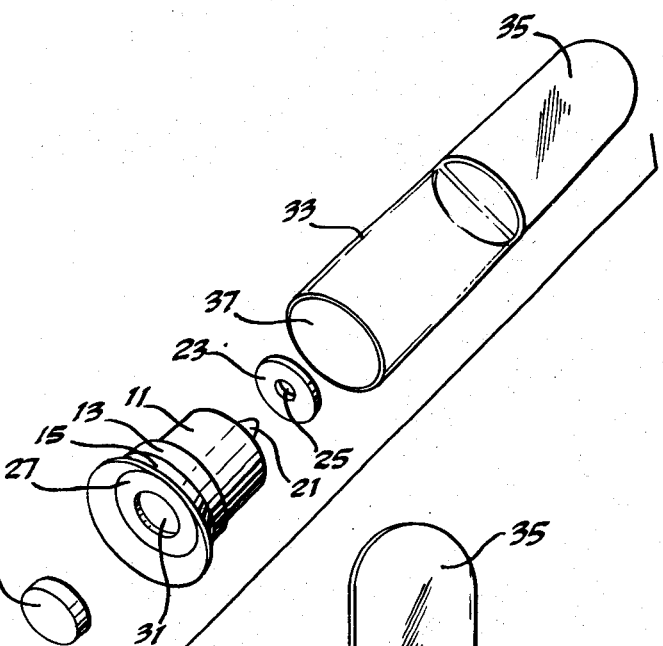
FIG. 4 illustrates an exploded perspective view of the embodiment of the invention using the assembly of FIG. 1 including the sample vial into which it is inserted.

Turning now to FIG. 4 there is illustrated an exploded perspective view of the preferred embodiment of the invention along with the sample vial into which it is inserted. The plunger having cylinder section 11 connected to cylinder section 13 which in turn is connected to conical section 15 has annular lip 27 with opening 31 through which filter 29 is inserted for retention interior to cylinder section 13 between annular lip 27 and the interior end of shaft 17 and ribs 19 (illustrated in FIG. 3). Shoulder 21 is inserted through central opening 25 in valve disc 23 to complete the plunger, filter and valve assembly. Cylinder 33 has opening 37 therein which fits over cylinder section 11 of the plunger, filter and valve assembly. The edge of cylinder 33 extends to the shoulder formed at the juncture of cylinder sections 13 and 11. Cylinder 33 has flat finger tab 35 attached to the other end extending across a diameter between the edges of the cylinder end. Vial 39 has opening 41 therein into which the entire combination of cylinder 33 with the plunger, filter and valve assembly mounted therein are inserted.

Figure 5:
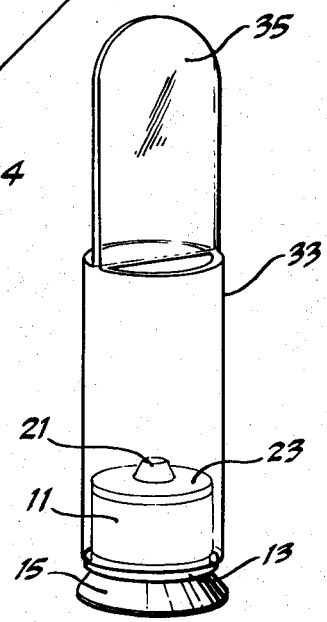
FIG. 5 illustrates a perspective view of the assembled invention of FIG. 4.

FIG. 5 illustrates a perspective view of the assembled preferred embodiment of the invention illustrated in FIG. 4. Cylinder section 11 fits interior to the end of cylinder 33, the end of cylinder 33 engaging the shoulder between cylinder sections 11 and 13. Conical section 15 extends outwardly beyond the diameter of cylinder 33. Shoulder 21 holds valve disc 23 juxtaposed the end of cylinder section 11 interior to cylinder 33. The other end of cylinder 33 has flat finger tab 35 attached thereto between the edges thereof across a diameter.

Figure 6:
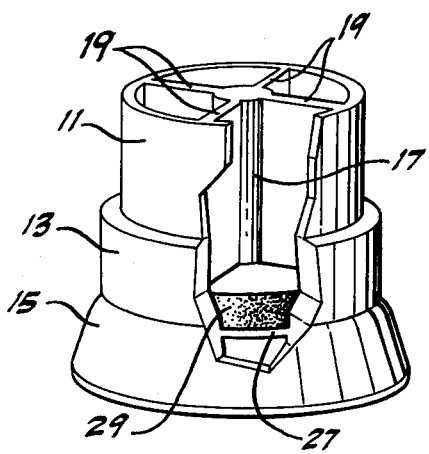
FIG. 6 shows a cut-away perspective view of the plunger and filter assembly of another embodiment of the invention.

Referring now to FIG. 6, there is shown a plunger assembly similar to FIG. 1 wherein a cylinder section 11 which in turn is integrally connected to another cylinder section 13 of larger diameter forming a shoulder at their juncture. Cylinder section 13 is further integrally joined to a conical skirt or lip 15 which extends outwardly from cylinder section 13. Interior to cylinder section 11 is shaft 17 centrally located within the central opening of cylinder section 11 by four flat ribs 19. Ribs 19 extend along perpendicular diameters of cylinder section 11 and are integrally formed to shaft 17 and to the interior walls of cylinder section 11. Ribs 19 further extend along the length of cylinder section 11 and are rectangular in shape and provide mechanical support to the cylindrical shape of cylinder section 11. Note that there is no disc value in the assembly of FIG. 6.

Similar to FIG. 1, filter 29 is shaped to fit into the interior volume of cylinder section 13. It is fixedly held therein by circular lip 27 extending around the circumference of the interior edge of cylinder section 13 adjacent conical section 15. Filter 29 rests against the end of shaft 17 and ribs 19 of cylinder section 13.

Figure 7:
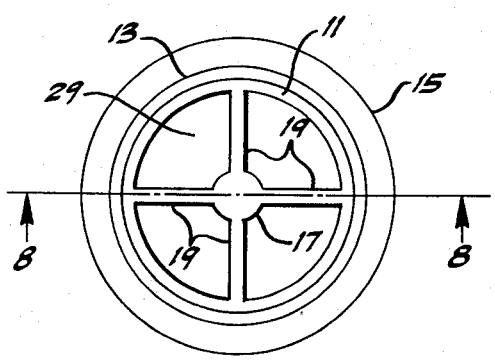
FIG. 7 illustrates a top view of the assembly shown in FIG. 6.

FIG. 7 illustrates a top view of the assembly shown in FIG. 6. Ribs 19 are shown located along perpendicular diameters of cylinder section 11 and joined by central shaft 17.

Figure 8:
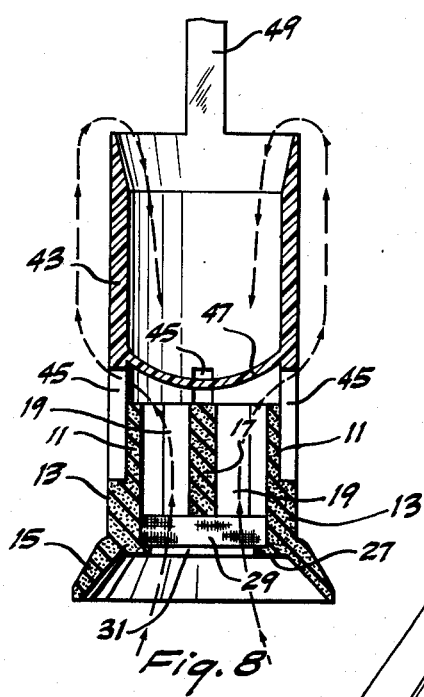
FIG. 8 shows a cross section of the assembly mounted in a slotted collector cylinder, taken on line 8—8 of FIG. 7 looking in the direction of the arrows.

FIG. 8 illustrates a cross section view of the plunger and filter assembly of FIGS. 6 and 7 including the cylinder into which the assembly is mounted. The plunger and valve are shown made of a flexible material such as rubber or soft plastic. Cylinder section 11 is shown interior to cylinder 43, the edge of cylinder 43 resting against the shoulder formed by the juncture of cylinder section 11 and cylinder section 13. Elongated slots or openings 45 extend from the edge of cylinder 43 beyond the walls of cylinder section 11 to provide an opening through the walls of cylinder 43 to cylinder section 11 mounted therein. Closure 47 forms the bottom of a container or cup in cylinder 43, the walls of which have holding arms 49 extending therefrom. As in FIG. 1, filter 29 is forceably inserted through flexible opening 31 and held between ribs 19 and shaft 17 on one side and lip 27 on the other.

Figure 9:
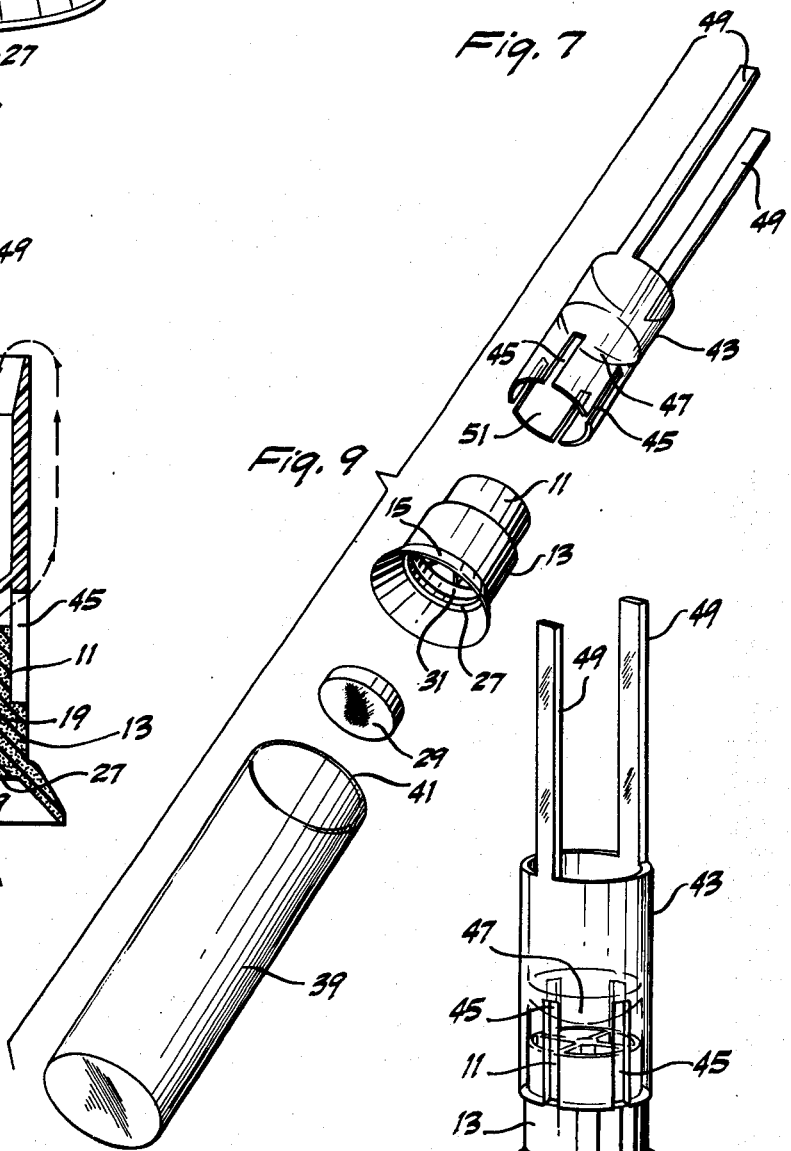
FIG. 9 illustrates an exploded perspective view of a preferred embodiment of the invention including the sample vial into which it is inserted.

Turning now to FIG. 9, there is illustrated an exploded perspective view of a preferred embodiment of the invention along with the sample vial into which it is inserted. The plunger having cylinder section 11 connected to cylinder section 13 which in turn is connected to conical section 15 has annular lip 27 with opening 31 through which filter 29 is inserted for retention interior to cylinder section 13 between annular lip 27 and the interior end of shaft 17 and ribs 19 (illustrated in FIG. 8). It should be noted that lip 27 may be eliminated and opening 31 made slightly less in diameter than filter 29 such that filter 29 is held in opening 31 by the elastic stretching of opening 31. Cylinder 43 has opening 51 therein which fits over cylinder section 11 of the plunger. The edge of cylinder 43 extends to the shoulder formed at the juncture of cylinder sections 13 and 11 and has elongated slots 45 extending from the edge past the end of cylinder section 11. Cylinder 43 has a pair of elongated flat finger or holding arms 49 attached to and longitudinally extending from the other end of cylinder 43 and oppositely disposed across a diameter between the edges of the cylinder end. Closure 47 forms the bottom of a cup composed of the walls of the end of cylinder 43 attached to holding arms 49 and closure 47. Vial 39 has opening 41 therein into which the entire combination of cylinder 43 with the plunger and filter assembly mounted therein are inserted.

Figure 10:
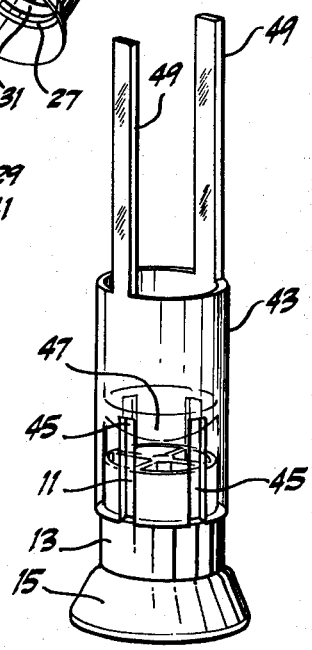
FIG. 10 illustrates a perspective view of the assembled preferred embodiment of the invention of FIG. 9.

FIG. 10 illustrates a perspective view of the assembled preferred embodiment of the invention illustrated in FIG. 9. Cylinder section 11 fits interior to the end of cylinder 43, the end of cylinder 43 engaging the shoulder between cylinder sections 11 and 13. Conical section 15 extends outwardly beyond the diameter of cylinder 43. Elongated openings or slots 45 extend longitudinally from the end of cylinder 43 beyond the end of cylinder section 11 but short of closure 47. The other end of cylinder 43 has flat finger tabs or arms 49 attached thereto oppositely disposed across a diameter. Tabs 49 are spaced and shaped to be easily grasped by a human operator.

Operation of the device illustrated in FIGS. 1–5 can readily be understood by first referring to FIG. 4. Cylinder 33 with the plunger, filter and valve assembly mounted therein comprises the skimmer assembly which is grasped and held by a human operator by means of flat finger tab 35 attached to the cylinder. Tab 35 is normally held between the thumb and index finger of the operator whereby the skimmer assembly can be inserted into vial 39 through opening 41. As the skimmer assembly is inserted into vial 39, conical section 15 engages the interior surface of vial 39 and the edges thereof are forced outwardly by the friction of the interior surface of vial 39 to provide a liquid tight seal forcing the contents of the vial through opening 31 of the plunger as the plunger is forced into the fluid contents of the vial.

Turning now to FIG. 3, the fluid enters opening 31 and passes through filter 29 and through the central opening of cylinder section 11 between ribs 19 and against valve disc 23. The pressure of the fluid forces flexible valve disc 23 to bend away from the end of cylinder section 11 as well as to slide along shaft 17 up against shoulder 21 thereby creating a gap between valve disc 23 and the edges of cylinder section 11 through which the fluid may pass into the interior of cylinder 33. Therefore, the skimmer assembly can be inserted into vial 39 and remove a desired portion of the fluid contents thereof into the interior of cylinder 33. After the desired point of insertion has been reached, the human operator removes the skimmer assembly by pulling tab 35 outwardly away from the interior of vial 39. The shape of conical section 15 allows the edges thereof to move freely against the interior surface of vial 39 with a minimum of friction. Therefore, a very poor seal is made between the edges of conical section 15 and the interior of vial 39 as the skimmer assembly is being withdrawn and air can escape past the edges of conical section 15 into vial 39 preventing any significant partial vacuum which would tend to remove the collected fluid from the interior of cylinder 33. To further prevent the flow of fluid from the interior of cylinder 33 back into vial 39, valve disc 23 seats tightly against the edges of cylinder section 11 closing the opening therethrough.

Although cylinder disc 23 is illustrated as being slideable on shaft 17, it should be noted that cylinder disc 23 is flexible and may be rigidly attached to shaft 17 and still provide the valve action described above. As fluid enters into cylinder 33, the force of the fluid moves the flexible edges of valve disc 23 away from the edges of cylinder section 11 and allows the fluid to pass into cylinder 33. However, upon removal of cylinder 33 from the sample vial 39, the forces tending to remove fluid from cylinder 33 press the edges of cylinder disc 23 tightly against the edges of cylinder section 11 to prevent removal of fluid from the interior of cylinder 33.

Once the skimmer is removed from sample vial 39, the fluid container cylinder 33 is readily held by the operator by finger tab 35 at the end of cylinder 33. The operator can then insert the entire skimmer assembly into an analyzer for analysis of the contents. Furthermore, it should be observed that tab 35 may be broken from cylinder 35 by applying appropriate forces to break the bonds between tab 35 and the edges of cylinder 33 thereby eliminating any interference by tab 35 with analysis procedures or analysis apparatus.

After the contents of cylinder 33 have been analyzed, the entire assembly may be discarded. The materials used in the skimmer assembly may be of low cost material such as plastic, thereby enabling the throw-away feature.

It is to be noted that in some instances, it will not be necessary to remove the skimmer assembly from sample vial 39. It may be sufficient to raise cylinder 33 outwardly to extend just beyond the end of sample vial 39 for appropriate analysis. Therefore, it should be clear that the present invention provides substantial utility for processing skimmed samples of blood serum that heretofore have not been possible.

Operation of the device of FIGS. 6–10 can readily be understood by first referring to FIG. 9. Cylinder 43 with the plunger and filter assembly mounted therein comprises the skimmer assembly which is grasped and held by a human operator by means of the pair of flat finger tabs or holding arms 49 attached to one end of the cylinder. Arms 49 are spaced by the diameter of cylinder 43 to be normally held between the thumb and index finger of the operator whereby the skimmer assembly can be inserted into vial 39 through opening 41. As the skimmer assembly is inserted into vial 39, conical section 15 engages the interior surface of vial 39 and the edges thereof are forced outwardly by the friction of the interior surface of vial 39 to provide a liquid tight seal forcing the contents of the vial through opening 31 of the plunger as the plunger is forced into the fluid contents of the vial.

Turning now to FIG. 8, the fluid enters opening 31 in the direction of the arrows and passes through filter 29 and through the central opening of cylinder section 11 between ribs 19 and exits through that portion of elongated slots 45 extending beyond cylinder section 11. Since there is a space between the walls of cylinder 43 and vial 39, the fluid then flows between the walls thereof beyond the other end of cylinder 43 and into the container or cup formed by the other end of cylinder 43 and closure 47. Therefore, the skimmer assembly can be inserted into vial 39 and remove a desired portion of the fluid contents thereof into the cup or container portion of cylinder 43. After the desired point of insertion has been reached, the human operator removes the skimmer assembly by pulling cylinder 43 from the interior of vial 39. The shape of conical section 15 allows the edges thereof to move freely against the interior surface of vial 39 with a minimum of friction. Therefore, a very poor seal is made between the edges of conical section 15 and the interior of vial 39 allowing the skimmer assembly to be removed. Because of the poor seal between the edges of conical section 15 and the interior of vial 39 as the skimmer assembly is being withdrawn, air can escape past the edges of conical section 15 into vial 39 preventing any significant partial vacuum which would tend to prevent the removal.

Once the skimmer is removed from sample vial 39, the fluid container cylinder 33 is readily held by the operator by holding arms 49. The operator can then insert the entire skimmer assembly into an analyzer for analysis of the contents of the container portion of cylinder 43. Furthermore, it should be observed that holding arms or tabs 49 may be broken from cylinder 43 similar to tab 35 of FIGS. 4 and 5.

Similarly as before, after the contents of cylinder 43 have been analyzed, the entire assembly may be discarded. The materials used in the skimmer assembly of FIGS. 6–10 also may be of low cost material such as plastic and the like, thereby preserving the throw-away feature.

It is to be noted that in some instances, it will not be necessary to remove the skimmer assembly from sample vial 39. It may be sufficient to raise cylinder 43 outwardly as before mentioned in respect to cylinder 33 to extend just beyond the end of sample vial 39 for appropriate analysis. Therefore, it should be clear that the present invention provides substantial utility for processing skimmed samples of blood serum that heretofore have not been possible.

It now should be apparent that the present invention provides a blood serum skimmer which may be employed in conjunction with a sample vial of sedimentated or centrifuged blood for skimming filtered serum therefrom into a cylinder container for further analysis, by providing a plunger, filter and valve assembly which mounts into the end of the cylinder whereby serum is skimmed, filtered and retained in the cylinder for analysis.

Although particular components, etc., have been discussed in connection with the specific embodiment of a blood serum skimmer assembly constructed in accordance with the teachings of the present invention, others may be utilized. Furthermore, it will be understood that although an exemplary embodiment of the present invention has been disclosed and discussed, other applications and structural arrangements are possible and that the embodiments disclosed may be subjected to various changes, modifications, and substitutions without necessarily departing from the spirit of the invention.

We claim:

1. A plunger and valve assembly for insertion into the end of a cylinder whereby the cylinder with the assembly may be inserted into a vial to skim off the fluid contents therein, comprising:

a plunger member having dual cylinder sections, joined together in tandem and a central opening therethrough, one cylinder section having a smaller diameter than the other cylinder section and being adapted to be inserted into one end of a cylinder, said other cylinder section having a projecting lip therearound to engage and seal said plunger member with the interior wall of a vial into which said plunger member may be inserted, said other cylinder section having an annular lip which partially closes said central opening of said plunger member;

radial ribs located within said central opening of said plunger member, said ribs having a shaft extending beyond the end of said one cylinder section, said shaft having a shoulder thereon which is constructed and arranged to be inserted through a central opening of a disc valve to hold the disc on said shaft in engagement therewith between said one end of said one cylinder section and said shoulder;

a circular disc valve having a diameter substantially the same as said end of said one cylinder section, said disc valve having a central opening therein by which said disc is mounted on said shaft and held thereon by said shoulder on said shaft such that when said plunger member is inserted into a vial, the uppermost contents of the vial are passed through said plunger between said end of said one cylinder section and said disc valve and when said plunger is removed from the vial, said disc valve closes said end of said one cylinder section to retain the contents passed therethrough thereby skimming the uppermost contents of the vial;

a filter disc mounted between said annular lip and said shaft having ribs thereon for filtering the contents skimmed from the vial;

a cylinder having two ends, one end of which said one cylinder section of said plunger member is inserted; and a tab extending along a diameter of the opening of the other end of said cylinder and intersecting the walls of said cylinder, said tab being connected to the walls of said cylinder at each point of intersection, said tab extending from said other end of said cylinder outwardly to form a projection which may be grasped between the thumb and fingers of an operator of the assembly, whereby said cylinder and plunger may be manually inserted into the vial to skim the uppermost contents thereof, said tab being connected to said cylinder wall such that it may be broken easily therefrom after the vial has been skimmed to prevent interference with the analysis of the contents of said cylinder.

2. The plunger and valve assembly described in claim 1 wherein said cylinder has walls which are transmissive to radiant energy which may be directed therethrough from a radiant energy analyzer for analysis of the contents thereof.

3. The plunger and valve assembly described in claim 2 wherein said projecting lip around said other cylinder section is a frusto-conical section extending from the end of said other cylinder section to engage and seal said plunger member with the interior wall of the vial when said plunger member is being inserted therein and to allow air to escape therebetween when said plunger member is withdrawn therefrom.

4. The plunger and valve assembly described in claim 3 wherein said circular disc valve is made from a flexible material and is immovably attached to said shaft, said circular disc valve flexing away from said one end of said one cylinder section to allow fluid to forceably enter into the cylinder and normally flexing against said one end of said one cylinder section thereby forming a seal to prevent fluid from escaping from the cylinder.

5. The skimmer assembly for insertion into a vial for skimming the fluid contents therein, comprising:
a plunger member having dual cylinder sections joined together in tandem and a central opening therethrough, one cylinder section having a smaller diameter than the other cylinder section and being adapted to be inserted into one end of a cylinder member, said other cylinder section having a projecting lip therearound to engage and seal said plunger member with the interior wall of a vial into which said plunger member may be manually inserted, the open end of said other cylinder section being adapted for receiving and holding a filter disc;
a filter disc for inserting into said other cylinder section; and
a cylinder member having two open ends and a dividing wall interior thereto which separates the interior of said cylinder member into first and second volumes, the open end of said cylinder member adjacent said first volume having said one cylinder section of said plunger member mounted therein, the cylinder walls of said first volume having at least one opening therethrough located between said one cylinder section of said plunger member and said dividing wall, the open end of said cylinder member adjacent said second volume having handle means mounted thereon, said second volume forming a container such that when said plunger member and said cylinder member are manually inserted into a vial, the uppermost contents of the vial are passed through said filter disc and said plunger through said at least one opening in the cylindrical walls of said first volume and between the cylindrical walls of said second volume and the vial, and over the open end of said cylinder member adjacent said second volume into said container formed by said second volume, thereby skimming the uppermost contents of the vial.

6. The skimmer assembly described in claim 5 wherein said other cylinder section of said plunger member is elastic and has dimensions slightly smaller than said filter disc to elastically retain said circular filter disc within said central opening.

7. The skimmer assembly described in claim 5 wherein said filter is a fiberglass filter.

8. The skimmer assembly described in claim 5 wherein said handle means includes at least one elongated holding arm extending longitudinally from said open end of said cylinder member adjacent said second volume to form a projection which may be grasped between the thumb and fingers of an operator of the assembly whereby said cylinder member and said plunger member mounted therein may be inserted into the vial to skim the uppermost contents thereof, said at least one holding arm being mounted to said cylinder walls such that it may be broken easily therefrom after the vial has been skimmed to prevent interference with the analysis of the contents of said cylinder.

9. The skimmer assembly described in claim 5 wherein said cylinder has walls which are transmissive to radiant energy which may be directed therethrough from a radiant energy analyzer for analysis of the contents thereof.

10. The skimmer assembly described in claim 5 wherein said projecting lip of said other cylinder section of said plunger member is a frusto-conical section, said frusto-conical section extending outwardly and being constructed and arranged to engage and seal the plunger member with the interior wall of a vial when said plunger member is being inserted therein and being constructed and arranged to allow air to escape thereby when said plunger member is withdrawn.

* * * * *